US012235370B2

(12) United States Patent
Hong et al.

(10) Patent No.: US 12,235,370 B2
(45) Date of Patent: Feb. 25, 2025

(54) METHOD AND SYSTEM FOR DIRECTION FINDING AND CHANNEL SOUNDING USING PSEUDO-DOPPLER ANTENNA ARRAY

(71) Applicant: The Board of Trustees of The University of Alabama, Tuscaloosa, AL (US)

(72) Inventors: Yang-Ki Hong, Tuscaloosa, AL (US); Hoyun Won, Tuscaloosa, AL (US); Katelyn Rose Isbell, Tuscaloosa, AL (US); Leo Xavier Vanderburgh, Dayton, OH (US); Jonathan Thomas Platt, Tuscaloosa, AL (US); Woncheol Lee, Seoul (KR)

(73) Assignee: The Board of Trustees of The University of Alabama, Tuscaloosa, AL (US)

( * ) Notice: Subject to any disclaimer, the term of this patent is extended or adjusted under 35 U.S.C. 154(b) by 1156 days.

(21) Appl. No.: 16/925,541

(22) Filed: Jul. 10, 2020

(65) Prior Publication Data
US 2021/0011108 A1 Jan. 14, 2021

Related U.S. Application Data

(60) Provisional application No. 62/872,509, filed on Jul. 10, 2019.

(51) Int. Cl.
*G01S 3/46* (2006.01)
(52) U.S. Cl.
CPC .................................. *G01S 3/46* (2013.01)

(58) Field of Classification Search
CPC ...... G01S 3/46; G01S 3/043; G01S 3/48; G01S 3/8083
See application file for complete search history.

(56) References Cited

U.S. PATENT DOCUMENTS

| 5,945,947 | A  | * | 8/1999  | Cunningham | G01S 3/043 342/417 |
| 9,581,681 | B2 | * | 2/2017  | Lynch | G01S 7/02 |
| 2004/0085243 | A1 | * | 5/2004  | Kuokkanen | G01S 19/51 342/462 |
| 2010/0309051 | A1 | * | 12/2010 | Moshfeghi | G01S 5/0236 342/451 |

(Continued)

FOREIGN PATENT DOCUMENTS

| RU | 2236692 C2 * | 9/2004 | ........... G01C 21/206 |
| RU | 2331103 C1 * | 8/2008 | |
| WO | WO-2008129114 A1 * | 10/2008 | ............... H01Q 3/40 |

OTHER PUBLICATIONS

Novosel and Šišul., "Comparison of pseudo noise sequence lengths for a correlator channel sounder." Proceedings ELMAR-2014. IEEE, 2014. (Year: 2014).*

(Continued)

*Primary Examiner* — Yuqing Xiao
*Assistant Examiner* — Christopher Richard Walker
(74) *Attorney, Agent, or Firm* — Meunier Carlin & Curfman LLC

(57) ABSTRACT

A direction-finding system is disclosed. The receiving system includes a channel sounder using a Pseudo-Doppler Antenna Array (PDAA) configured to locate transmitters and to sound the channel at pre-defined operating frequency.

18 Claims, 11 Drawing Sheets

(56) References Cited

U.S. PATENT DOCUMENTS

| | | | |
|---|---|---|---|
| 2011/0148578 A1* | 6/2011 | Aloi | G01S 3/54 |
| | | | 340/8.1 |
| 2012/0249371 A1* | 10/2012 | Nguyen | G01S 1/68 |
| | | | 342/442 |
| 2014/0070996 A1* | 3/2014 | Kneckt | H04W 64/006 |
| | | | 342/417 |
| 2016/0282446 A1* | 9/2016 | Kenders | G01S 5/04 |
| 2018/0128910 A1* | 5/2018 | Lee | G01S 13/426 |

OTHER PUBLICATIONS

Hrabal et al., "The radio direction finding with advantage of the software defined radio." Computer Information Systems and Industrial Management: 15th Ifip TC8 International Conference, CISIM 2016, Vilnius, Lithuania, Sep. 14-16, 2016. (Year: 2016).*

Carroll and Wysocki., "Delay Characteristics for an IEEE 802.11 a Indoor Wireless Channel." Proc. 7th Int. Symp. Communication Theory and Applications (ISCTA 2003). 2003. (Year: 2003).*

Gonzalez and Fung, "A pilot study on aeronautical surveillance system for drone delivery using heterogeneous software defined radio framework," 2017 IEEE International Conference on Real-time Computing and Robotics (RCAR), Okinawa, Japan, 2017, pp. 499-504 (Year: 2017).*

RU-2331103-C1 (machine translation) (Year: 2008).*

RU-2236692-C2 (machine translation) (Year: 2004).*

Yin et al. ("Performance Evaluation of a Hybrid-Beamforming Sounder for 26 GHz Channel Measurements," 2017 IEEE 86th Vehicular Technology Conference (VTC-Fall), Toronto, ON, Canada, 2017, pp. 1-5) (Year: 2017).*

Ball, "Portable and low-cost channel sounding platform for VHF / UHF IoT propagation research." In: Loughborough Antennas & Propagation Conference (LAPC 2017). The 13th Loughborough Antennas and Propagation Conference, Sep. 13-14, 2017, Loughborough, UK. IET. ISBN 978-1-78561-699-0. Date Added to IEEE Xplore: May 24, 2018.

Aloi et al., "Modeling and Validation of a 915 MHz Single Channel Pseudo Doppler Direction Finding System for Vehicle Applications", 2009 IEEE 70th Veh. Techno. Conf. Fall, Jan. 2010.

RDF Products, "A Comparison of the Watson-Watt and Pseudo-Doppler DF Techniques" White paper WN-004, Rev. N-01, Apr. 1999.

Islam, et al., "A wireless channel sounding system for rapid propagation measurements" 2013 IEEE Int. Conf. Comm., pp. 5720-5725, Nov. 2013.

Keysight Technologies, "Defining a Channel Sounding Measurement System for Characterization of 5G Air Interfaces—Application notes," Keysight Technologies, Dec. 2017.

Hrabal, et al. "The Radio Direction Finding with Advantage of the Software Defined Radio", IFIP Int. Federation for Information Processing, pp. 720-728, Sep. 2016.

McClaning, "Wireless Receiver Design for Digital Communication", 2nd Ed., Tamil Nadu, India: Yes Dee Publishing Pvt Ltd, pp. 329-355, 2012.

Mitsushi, "Narrowband 5 GHz Mobile Channel Characterization", Thesis, University of Colorado Boulder, Boulder, Colorado, 2015.

Reed, J., "Software Radio: A Modern Approach to Radio Engineering", Upper Saddle River, New Jersey: Prentice Hall, pp. 180, 2002.

Github.com, "HackRF One", 2017. [Online]. Available: https://github.com/mossmann/hackrf/wiki/HackRF-One. [Accessed: May 18, 2018].

Stieber, "Radio Direction Finding Network Receiver Design for Low-Cost Public Service Applications", Thesis, California Polytechnic State University, San Luis Obispo, California, 2012.

Whitlock, "High gain pseudo-Doppler antenna," Antennas & Propagati Conf., Loughborough, pp. 169-172, Nov. 2010.

Peavey et al., "The Single Channel Interferometer Using a Pseudo-Doppler Direction Finding System," Proc. of 1997 IEEE Conference, on Acoust., Speech, and Signal Processing, vol. 5, pp. 4129-4132, Apr. 1997.

Read, "Review of conventional tactical radio direction finding systems", in Defence Research Establishment Ottawa, Ottawa, Canada, May 1989.

Sadowski, "Measurement of Coherence Bandwidth in UHF Radio Channels for Narrowband Networks", International Journal of Antennas and Propagation, vol. 2015, Article ID 985892, 2015.

Novosel et al., "Comparison of pseudo noise sequence lengths for a correlator channel sounder", 56th Int. Symp. ELMAR, Oct. 2014.

Ciccognani, et al., "Time Domain Propagation Measurements of the UWB Indoor Channel Using PN-Sequence in the FCC-Compliant Band 3.6-6GHz", IEEE Trans. Ant. Propag., 53 (4), pp. 1542-1549, Apr. 2005.

Carroll, et al., "Delay Characteristics for an IEEE 802.11a Indoor Wireless Channel" Proc. of ISCTA '03, Ambleside, U.K., Jul. 2003.

* cited by examiner

METHOD AND SYSTEM FOR DIRECTION FINDING AND CHANNEL SOUNDING USING PSEUDO-DOPPLER ANTENNA ARRAY

RELATED APPLICATION

This application claims priority to, and the benefit of, U.S. Provisional Patent Application no. 62/872,509, filed Jul. 10, 2019, entitled "Method and System for Direction Finding and Channel Sounding Using Pseudo-Doppler Antenna Array," which is incorporated by reference herein in its entirety.

BACKGROUND

Radio direction finding (DF) is a technique that determines the angle of arrival (AoA) of an incoming signal. Angle-of-arrival estimation is widely adopted for military applications, emergency services, and amateur use in HAM radios. Indeed, there is a high demand for portable DF systems.

Conventional direction-finding systems often require multiple receivers and are also complex, bulky, and expensive. A single receiver direction-finding system has significant benefits of lightweight, low cost, less complexity, and low power consumption. Two widely known single receiver systems are the Watson-Watt antenna array (WWAA) and Pseudo-doppler antenna array (PDAA), where an antenna array is used to perform amplitude or phase comparison, to determine the angle of arrival. The WWAA system is significantly more complicated than a Pseudo-doppler antenna array at frequencies over 1 GHz. Further description of WWAA and Pseudo-doppler antenna array systems may be found in [1] and [2], which is incorporated by reference herein.

SUMMARY

The exemplary system and method employs Pseudo-doppler antenna array in a direction-finding system, the system being configured, in some embodiments, with angle-of-arrival estimation accuracy and channel modeling operations, e.g., via channel sounding. The instant system is expected to have improved performance in complicated environments, like complex buildings by using real-time measurements of the wireless channel. Channel sounding (CS) refers to the act of characterizing an emitted signal's traveled path and is used, in some embodiments, to increase the bit rate and reliability of a wireless channel.

The exemplary system and method is configured, in some embodiments, to be low-power, inexpensive, small, and light. Software-defined radio (SDR) is used, in some embodiments, to provide small form factor and flexibility as compared to use of dedicated equipment. The instant software-defined radio may be optimized to a link budget determined for complicated environments, e.g., like complex buildings.

In an aspect, a method is disclosed to direction find a transmission source of a signal, the method including: transmitting, from a first device (e.g., source device), a plurality of signals through a wireless channel, including a first transmitted signal and a second transmitted signal, wherein the plurality of signals are modulated in transmission to generate a Doppler shift of the transmitted plurality of signals; receiving, by a processor of a second device (e.g., tracking device), the plurality of signals at a plurality of antennas (e.g., an antenna array), including a first received signal and the second received signal, wherein the first received signal corresponds to the first transmitted signal, and wherein the second received signal corresponds to the second transmitted signal; determining, by the processor of the second device, phase difference between the received first transmitted signal and the received second transmitted signal; determining, by the processor of the second device, an angle of arrival of the plurality of signals based on the determined phase difference; and outputting, by the processor of the tracking device, at a graphic user interface of the second device, an indication of the determined angle of arrival.

In some embodiments, the method further includes characterizing the wireless channel using a channel sounding operation to estimate a characteristic value associated with the wireless channel, wherein the estimated characteristic value is used to determine the angle of arrival of the plurality of signals.

In some embodiments, the processor of the second device is configured to execute a software-defined radio.

In some embodiments, the first transmitted signal comprises a signal code sequence, and wherein the step of estimating the characteristic value associated with the wireless channel comprises match-filtering the received first transmitted signal with an inversed sequence of the signal code sequence.

In some embodiments, the step of match filtering includes performing a convolution operation of the received first transmitted signal and the signal code sequence.

In some embodiments, the signal code sequence is a predefined code (pseudo-noise code, pseudo-random-noise code, or a random code) stored in memory of the first device and second device.

In some embodiments, the signal code sequence is a pseudo-noise code having parameters known to the first device and second device.

In some embodiments, the plurality of antennas form an antenna array.

In some embodiments, the antenna array comprises an n-omnidirectional monopole antenna, wherein n has a value of 2, 3, 4, 5, 6, 7, 8, 9, 10, 11, 12, 13, 14, 15, 16, 17, or 18.

In some embodiments, the plurality of antennas are tuned for 2.4 Ghz reception.

In some embodiments, the plurality of antennas are tuned to a frequency band ranging between 1 Mhz and 6 Ghz.

In some embodiments, the processor of the second device comprises an embedded microcontroller.

In some embodiments, the embedded microcontroller is configured to execute a GNU radio and Matlab coder.

In some embodiments, the step to determine the phase difference comprises use of one or more of a filter, a demodulator, a fast Fourier transform, and a complex to rectangular transform.

In some embodiments, the step to characterize the wireless channel comprises use of one or more of a clock synchronizer, a signal stabilizer, a demodulator, and an autocorrelator.

In some embodiments, the step to determine the phase difference comprises use of a filter selected from the group consisting of a low pass filter, a high pass filter, and a band-pass filter.

In some embodiments, the step to characterize the wireless channel comprises use of a demodulator selected from the group consisting of an amplitude demodulator, a frequency demodulator, a phase demodulator, a quadrature demodulator, and a binary demodulator.

In some embodiments, the modulation in transmission is based on amplitude modulation.

In some embodiments, the modulation in transmission is based on frequency modulation.

In some embodiments, the modulation in transmission is based on phase modulation.

In some embodiments, the modulation in transmission is based on quadrature modulation.

In some embodiments, the modulation in transmission is based on binary modulation.

In another aspect, a system is disclosed comprising a microcontroller configured to execute any of the above-discussed method steps.

In another aspect, a system is disclosed comprising a processor of the first device, wherein the processor is configured by instructions to perform any of the above-discussed method steps.

In another aspect, a system is disclosed comprising a processor of the second device, wherein the processor is configured by instructions to perform any of the above-discussed method steps.

BRIEF DESCRIPTION OF THE DRAWINGS

FIG. 2C shows transmission performance of the transmitter device of FIG. 1.

DETAILED DESCRIPTION

Figure 1:
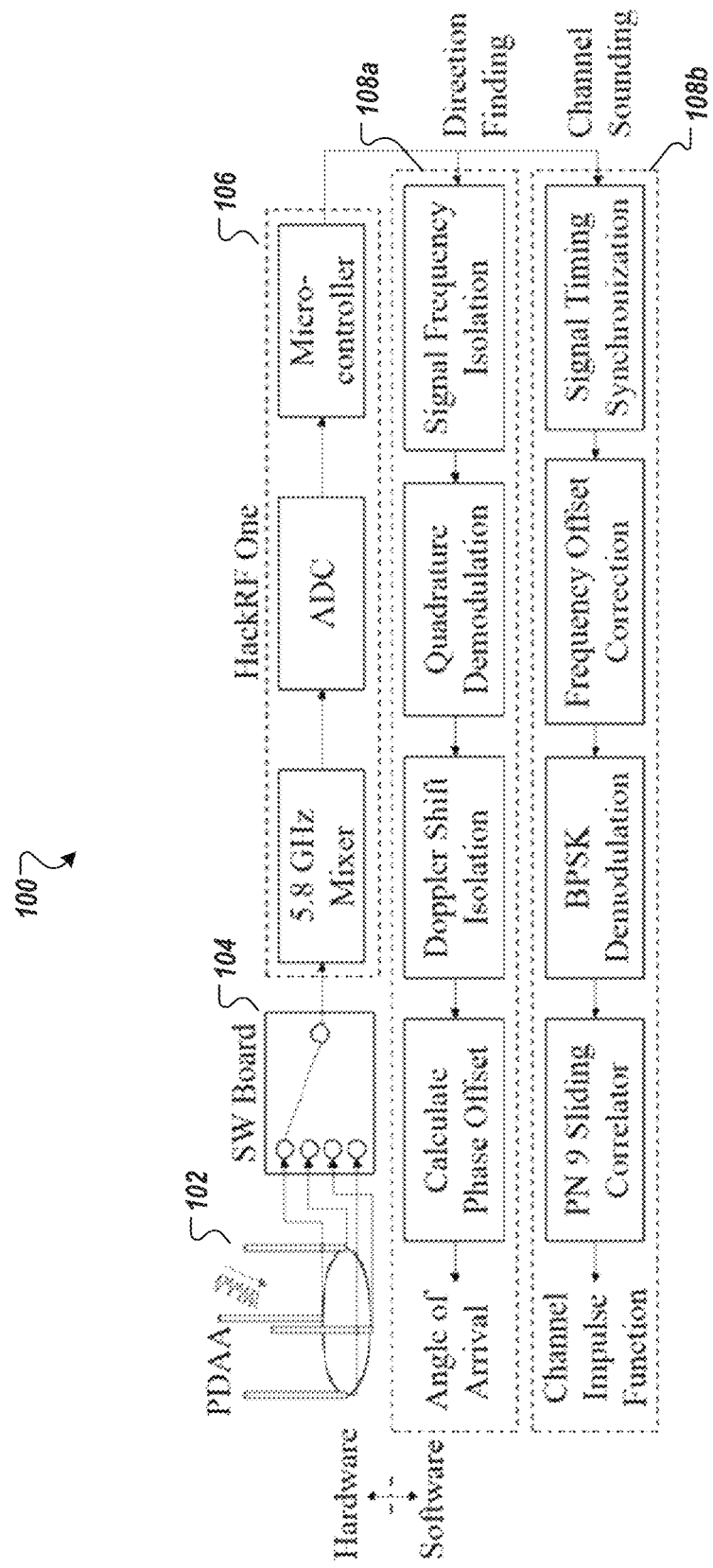
FIG. 1 shows a diagram of a system configured for direction-finding and channel-sounding in accordance with an illustrative embodiment.

In some aspects, the disclosed technology relates to antenna array for direction finding. Although example embodiments of the disclosed technology are explained in detail herein, it is to be understood that other embodiments are contemplated. Accordingly, it is not intended that the disclosed technology be limited in its scope to the details of construction and arrangement of components set forth in the following description or illustrated in the drawings. The disclosed technology is capable of other embodiments and of being practiced or carried out in various ways.

It must also be noted that, as used in the specification and the appended claims, the singular forms "a," "an" and "the" include plural referents unless the context clearly dictates otherwise. Ranges may be expressed herein as from "about" or "approximately" one particular value and/or to "about" or "approximately" another particular value. When such a range is expressed, other exemplary embodiments include from the one particular value and/or to the other particular value.

By "comprising" or "containing" or "including" is meant that at least the named compound, element, particle, or method step is present in the composition or article or method, but does not exclude the presence of other compounds, materials, particles, method steps, even if the other such compounds, material, particles, method steps have the same function as what is named.

In describing example embodiments, terminology will be resorted to for the sake of clarity. It is intended that each term contemplates its broadest meaning as understood by those skilled in the art and includes all technical equivalents that operate in a similar manner to accomplish a similar purpose. It is also to be understood that the mention of one or more steps of a method does not preclude the presence of additional method steps or intervening method steps between those steps expressly identified. Steps of a method may be performed in a different order than those described herein without departing from the scope of the disclosed technology. Similarly, it is also to be understood that the mention of one or more components in a device or system does not preclude the presence of additional components or intervening components between those components expressly identified.

Some references, which may include various patents, patent applications, and publications, are cited in a reference list and discussed in the disclosure provided herein. The citation and/or discussion of such references is provided merely to clarify the description of the disclosed technology and is not an admission that any such reference is "prior art" to any aspects of the disclosed technology described herein. In terms of notation, "[n]" corresponds to the nth reference in the list. For example, [16] refers to the 16th reference in the list, namely, L. Novosel and G. Sisul, "Comparison of pseudo noise sequence lengths for a correlator channel sounder," 56th Int. Symp. ELMAR, October 2014. All references cited and discussed in this specification are incorporated herein by reference in their entireties and to the same extent as if each reference was individually incorporated by reference.

In the following description, references are made to the accompanying drawings that form a part hereof and that show, by way of illustration, specific embodiments or examples. In referring to the drawings, like numerals represent like elements throughout the several figures.

Example System

FIG. 1 shows a diagram of a system 100 configured for direction-finding and channel-sounding in accordance with an illustrative embodiment. The system 100 includes an antenna array 102, switching system (OC) 104, receiving system (HO) 106, and digital processor (e.g., a laptop computer) 108 (shown as 108a and 108b).

Antenna: The Pseudo Doppler principle is applied, in some embodiments, to circular arrays (e.g., 102) with 3 or more omnidirectional antennas. Other configuration, e.g., with 4 or 8 antennas may be used. [10-13]. To simplify the switching system (e.g., 104), in some embodiments, an array of 4 antennas is used. Further, in some embodiments, the separation between adjacent elements ($d_{adj}$) is configured with less than 0.25 wavelengths of the operating frequency (A) to reduce angle detection error [5, 12].

In some embodiments, monopole antenna arrays (e.g., 102) were each configured with a monopole height of 0.25λ, $d_{adj}$ of 0.2λ. In some embodiments, the array radius ($r_{array}$) is 0.1414λ, and the ground plane radius ($r_{ground}$) is 0.391λ, e.g., where $r_{ground}=r_{array}+0.25λ$. The monopole antennas, in some embodiments, are fabricated from copper wire (radius of 0.406 mm), and the ground planes are milled, e.g., using a LPKF ProtoMat S62 milling machine. The antenna elements may be configured (e.g., scattering (S)-parameters and radiation pattern) using a vector network analyzer and an anechoic chamber. Fabricated antenna elements have been shown to have good impedance matching ($|S_{11}|>10$ dB) and omnidirectional radiation patterns at 5.8 GHz (not shown).

Switching system: The receiving system (e.g., 106) is configured to control the switching of the switching system (e.g., 104). In some embodiments, the receiving system (e.g., 106) uses $I_2C$ and GPIO (general-purpose IO) pins to drive logic gates and switches (e.g., GaAs FET I/C single-pole, and four-throw switches). The receiving system (e.g., 106) is configured to receive the Doppler-shifted signal through the switching system (e.g., 104) and interfaces with a processing unit (e.g., 108a, 108b). In some embodiments, the processing unit (e.g., 108a, 108b) comprises a digital signal processing (DSP) software (also referred to herein as GNU Radio) to determine the location of the transmitter device. To activate the channel-sounding mode, the switching system (e.g., 104) is controlled such that only one antenna of the Pseudo-doppler antenna array (e.g., 102) is used.

Receiving system: The received signal from the carrier frequency to the baseband is down-converted by the receiving system (e.g., 106) using a mixer so the broadband transceiver can receive it. Then, the signal is digitized using an analog-to-digital converter, so that the microcontroller can transfer the data to the host computer (e.g., 108a, 108b) via USB [9].

Digital processor: GNU Radio is used, in some embodiments, to perform DSP operations on the host computer (e.g., 108a, 108b). To perform direction finding, the SDR is, in some embodiments, first tuned to the carrier frequency. Then, the DC component of the tuned signal is, in some embodiments, removed by applying DC offset, and the signal is filtered through a low pass and a band-reject filter. The filtered signal undergoes, in some embodiments, quadrature and frequency demodulation, which recovers a sinusoidal wave, where the frequency of the wave is the switching rate of the array (e.g., 102). Comparison between the recovered and original switching signals may reveal a phase shift which is equivalent to the angle of arrival of the signal.

To characterize the channel, in some embodiments, a sliding correlator channel-sounding technique is adopted. The technique begins, in some embodiments, by tuning to the carrier frequency. Then, the baseband equivalent signal undergoes, in some embodiments, time synchronization to find a proper phase of root raised cosine pulses to maximize the SNR and minimize aliasing. The signal is then BPSK-demodulated and correlated with a known copy of a pseudo-noise 9-code sequence to produce a channel impulse response (CIR). To evaluate the channel impulse response, post-processing is performed. Example of post-processing (e.g., using Matlab software) are later described herein.

Various Implementation and Experimental Results

Figure 2A:
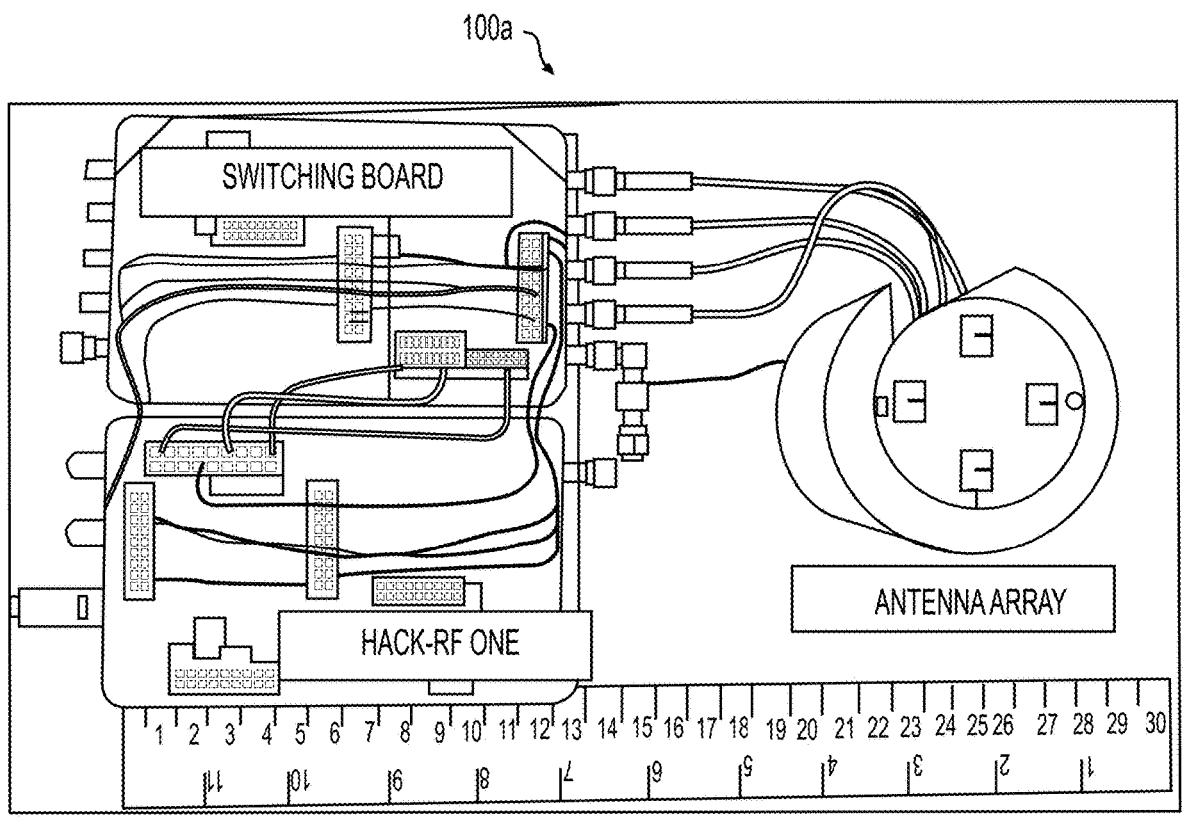
FIG. 2A shows an example fabricated receiver system of the system of FIG. 1.
Figure 2B:
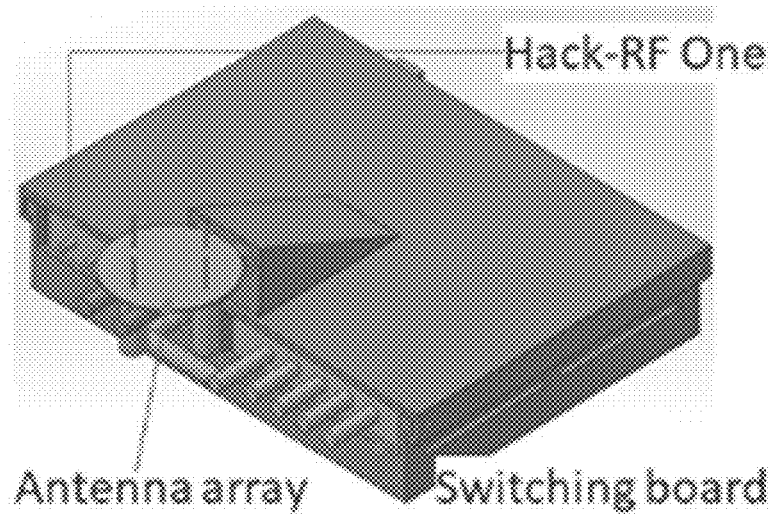
FIG. 2B shows a diagram of another configuration of the receiver system of FIG. 2A.

An embodiment was the instant system was designed and tested for operation at 5.8 GHz in an indoor environment. In the experiment, a transmitter device was configured with a monopole with an equivalent isotropic radiated power (EIRP) of 36 dBm. The transmitter device was also configured to send a Binary Phase Shift Keying (BPSK) modulated pseudo-noise (PN) 9 sequence with a 1 MHz chip rate ($f_c$). FIG. 2A shows an example fabricated hardware system of the system (e.g., 100) of FIG. 1. As shown in FIG. 2A, the system 100 (shown as 100a) is highly portable, powered through USB, and has the dimensions: 0.26 m (width), 0.16 m (length), and 0.082 m (height). FIG. 2B shows a diagram of another configuration of the receiver system 100 (shown as 100b) of FIG. 2A. FIG. 2C shows transmission performance of the transmitter device of FIG. 1.

Link Budget Assessment

In designing the embodiment was instant system (e.g., 100), to determine the minimum required receiving power ($P_r$), a minimum detectable signal (MDS) was calculated from the receiving system parameters as $MDS=F_{RX}+10\log_{10}(kT_0B_n)+SNR$, where $F_{RX}$ is the receiving system noise, k is the Boltzmann constant, $T_0$ is the antenna noise temperature, $B_n$ is the noise bandwidth, and SNR is the Signal to Noise Ratio [6]. Examples parameters used in the experiment is shown in Table 1.

TABLE 1

| Parameter | Values |
|---|---|
| Receiving System Noise Figure ($F_{RX}$) | 12 dB |
| Noise Bandwidth ($B_n$) | 1 MHz |
| Antenna Noise Temperature ($T_0$) | 300K |
| Minimum Detectable Signal (MDS) | −91.4 dBm |
| Signal Frequency (f) | 5.8 GHz |
| Maximum Path Distance (d) | 60 m |
| Receiving Power (Pr) | −91.4 dBm |
| EIRP | 36 dBm |
| Receiving Antenna Gain ($G_r$) | 0 dBi |

With an assumed SNR value of 10.6 dB for a $10^{-8}$ bit error rate in BPSK [6], the MDS was calculated to be −91.4 dB.

To detect a signal, the Pr was selected to be higher than the MDS. Using the calculated Pr, the receiving antenna gain ($G_r=PL+P_r-EIRP$) was determined using the log-distance path loss model, $PL=20\log_{10}(fd_0)+32.45+10n\log_{10}(d/d_0)$, where PL is the total path loss in dB, $d_0$ is a reference distance in m, f is a central frequency in GHz, d is a maximum path distance in meters, and n is a path loss exponent [7]. An n value of 4.48 and a d0 value of 1 meter were used to approximate a non-line-of-sight (NLOS) indoor environment [7]. The calculation confirms that the receiver device (e.g., 106) should have a gain $G_r$ of at least 0 $dB_i$ to detect the signal up to 60 m.

The receiver device (e.g., 106) was configured with at least a 2 MHz sampling rate (per Nyquist). The experiment was conducted using a Software Defined Radio (SDR) (HackRF-One, WRL-13001) as the receiving system (e.g., 106), which was configurable to up to 20 MHz and receive from 1 MHz to 6 GHz [9].

Doppler Criteria for Direction Finding

The experiment was evaluated with a Doppler antenna (DA) configured with a rotating receiver device (e.g., 106) to determine an angle of arrival (AoA) of an incoming signal. The antenna was configured to exploit the Doppler frequency shift (Δf). The Doppler frequency shift Δf is the difference between an observed and emitted frequency of a wave for a receiver device (e.g., 106) moving relatively to the transmitter device [5]. The Doppler frequency shift was calculated as $\Delta f=v f_{op}/c$, where $f_{op}$ is an operating frequency of the transmitted signal, v is the relative velocity of an observer, and c is the speed of light [10]. That is, when the observer moves toward the transmitter device, the observed frequency increases, and when the observer moves away from the transmitter device, the observed frequency decreases. For the Doppler antenna, the observed signal was frequency modulated with respect to the frequency of rotation ($f_r$). When the observed signal was demodulated, the $f_r$ is recovered with a phase offset, which is equivalent to the angle of arrival.

A Pseudo-doppler antenna array was used to simulate the behavior of a Doppler antenna by rapidly switching around a circular array of antennas. For the direction-finding experiment, a switching speed of 4 MHz was used to provide sufficient separation in the signal to distinguish between the Doppler shifted signals. A switching system (e.g., Opera Cake add-on board for the HackRF system) (e.g., 104) configured to switch at 4 MHz was used for the experiment.

For the experiment, the transmitter device (e.g., an Ettus Research Universal Software Radio Peripheral (USRP) N210) was configured to transmit a BPSK modulated PN9 sequence with the $f_c$ of 1 MHz. Because of low internal transmitting power ($P_t$) at 5.8 GHz (10 dBm), a power amplifier (e.g., Mini-Circuits ZN60-83LN12+) was used to amplify the transmitting power $P_t$. The EIRP at 5.8 GHz was 30.0 dBm (30 dBm Pt+0 dBi monopole). For testing at other $f_{op}$, an EIRP of 22.5 dBm (22.5 dBm $P_t$+0 dBi monopole) was used.

Two distinct testing locations were evaluated: outdoor (lower multipath effect) and indoor (higher multipath effect).

Figure 3:
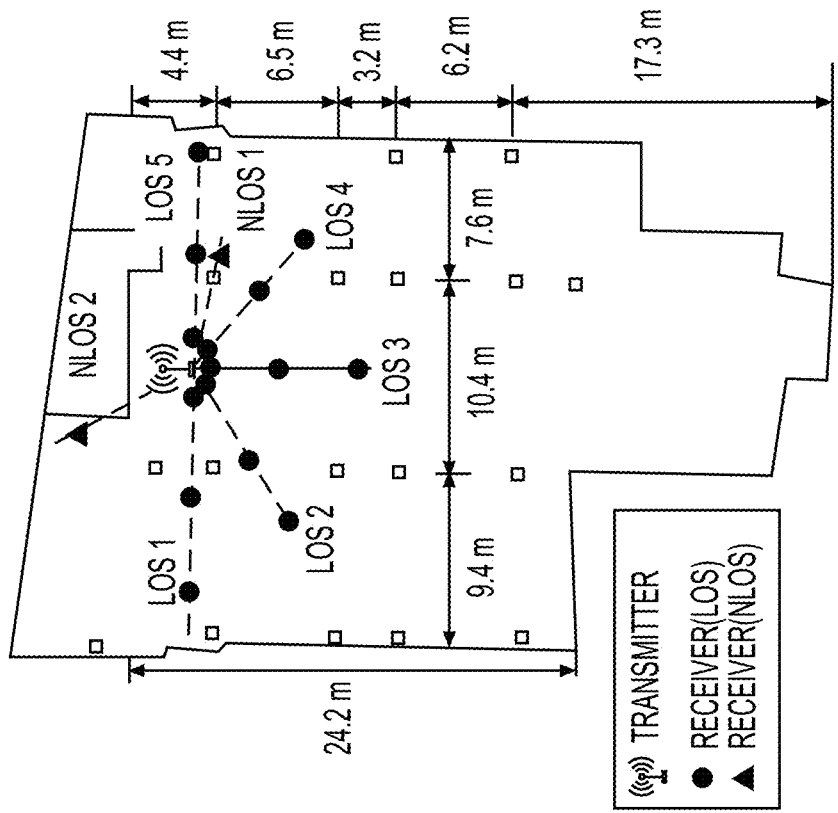
FIG. 3 shows experimental setup to evaluate the direction-finding and channel-sounding operation of the system of FIG. 1.
Figure 3:
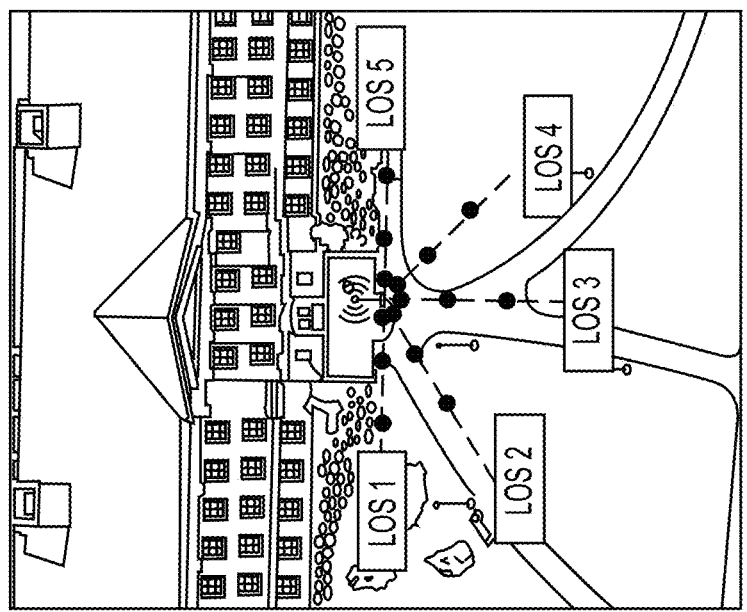

FIG. 3 shows experimental setup to evaluate the direction-finding and channel-sounding operation of the system (e.g., 100) of FIG. 1. In FIG. 3, the outdoor setup (left) was performed in open area surrounded by brick buildings, while the indoor setup (right) was performed in a large storm shelter composed primarily of concrete and drywall with concrete pillars dispersed throughout the room at regular intervals. For both setups, the transmitter device was placed in a known location 2 meters in front of a sheet wall (indoor) or building (outdoor). Then, the receiver device was placed at 1, 5, and 10 meters away from the transmitter device at AoA of 0° (line-of-sight (LOS) 1), −45° (LOS 20), −90° (LOS 3), −135° (LOS 4), and −180° (LOS 5). In the outdoor setup, the receiver device was also placed 20 meters away from the transmitter device.

To realize an indoor non-line-of-sight setup, the receiver device was placed 7 m away at known angle of arrival of −170° (behind the concrete pillar, NLOS "1") and 70° (behind the sheet wall, NLOS "2").

To evaluate the system's capability to detect the angle of arrival, the angle difference ($\theta_{Diff}$) between the measured and known angle of arrival was calculated. Then, the average $\theta_{Diff}$ taken at each angle-distance combination was calculated. For non-line-of-sight setups, the $\theta_{Diff}$ was expected to vary due to the unknown effects of the pillar or sheet wall, so accuracy was not assessed. For channel-sounding measurements, the receiver device was placed at 1 and 20 meters away from transmitter device at LOS "1" and 7 meters away from transmitter device at NLOS "1" and "2".

Direction Finding

In the experiment, the direction-finding capability of the Pseudo-doppler antenna array (e.g., 102) was evaluated at the $f_{op}$ of 5.8 GHz. The fabricated Pseudo-doppler antenna array (e.g., 102) showed average $\theta_{Diff}$ of 69.04°, 88.11°, and 63.08°, for indoor line-of-sight experiments, indoor non-line-of-sight experiments, and outdoor line-of-sight experiments, respectively.

To improve the $\theta_{Diff}$ at fOP of 5.8 GHz, the effect of the $d_{adj}$ on the $\theta_{Diff}$ was further investigated. To minimize phase angle change between adjacent monopoles and better approximate a continuously rotating antenna, $d_{adj}$ ranging from 0.125 to 0.375λ of Pseudo-doppler antenna array had been used [12].

Figure 4:
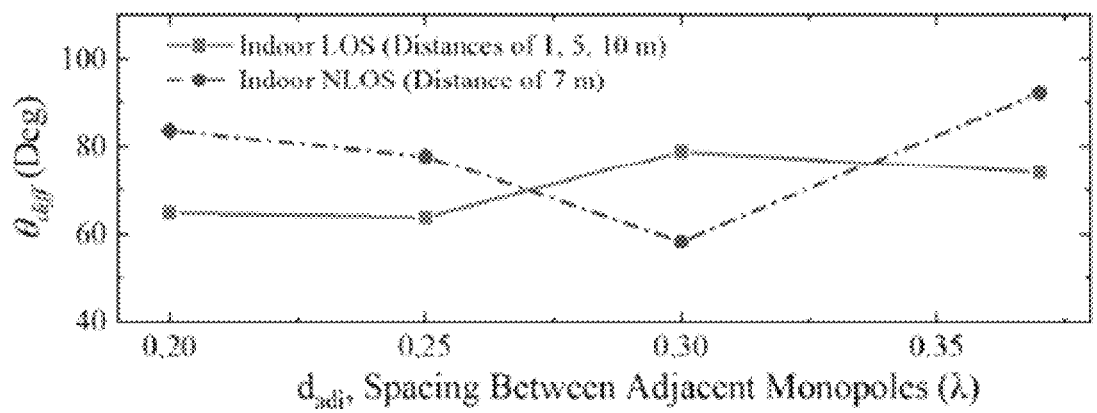
FIG. 4 shows experimental results of effects of spacing among antennas of the receiver system.

FIG. 4 shows experimental results of effect of spacing among antennas (e.g., 102) of the receiver system (e.g., 100). Specifically, FIG. 4 shows experimental results of the effect of spacing between adjacent monopoles on the angle difference of measured angle of arrival for indoor 5.8 GHz line-of-sight and non-line-of-sight operations. In FIG. 4, Pseudo-doppler antenna array with $d_{adj}$ of 0.200, 0.250, 0.300, and 0.375λ were evaluated in indoor LOS and NLOS (0.200λ was the minimum $d_{adj}$ possible with current fabrication method). The results for LOS show that $d_{adj}$ of 0.200λ has the lowest average $\theta_{Diff}$ of 69.04° when compared to average $\theta_{Diff}$ of 74.62°, 97.56°, and 76.04° at $d_{adj}$ of 0.250, 0.300, and 0.325λ, respectively.

According to [14], the bearing error due to the system's internal noise can be approximated by the following equation when the SNR is greater than 10 dB, Error(°)=2*10$^{-SNR/20}$*90λ/($\pi^2$D), where D is the diameter of the array. With a SNR of 10.6 dB and $d_{adj}$ of 0.200, 0.250, 0.300, and 0.375λ, the bearing error was calculated at 13.45, 10.76, 8.97, and 7.17°, respectively. Low SNR and surrounding factors were expected to increase the bearing error considerably.

To better understand the impact of multipath at 5.8 GHz on bearing accuracy, the system's performance was evaluated in ideal conditions and various multipath scenarios. A simulation system was configured with an array of radius 0.200λ to receive the direction-finding signal at 10.6 dB SNR. The simulation had four scenarios: one with no multipath and three with a delay 62.5 ns (one sample at 16 MHz sampling rate) and half the amplitude of the original signal with a phase offset of 0°, 90°, or 180°. The simulation showed a maximum error of 8°, 9°, 26°, and 24°, respectively. Because the simulation with static multipath does not fully account for the measured error, effects of time-varying multipath environments were evaluated. Specifically, because of the high $\theta_{Diff}$ measured at $f_{op}$ of 5.8 GHz, the effect of the $f_{op}$ was investigated. Additional Pseudo-doppler antenna array were fabricated with $d_{adj}$ of 0.200λ for $f_{op}$ of 2, 3, 4, and 5 and evaluated in indoor LOS and NLOS and outdoor LOS environments.

Figure 5:
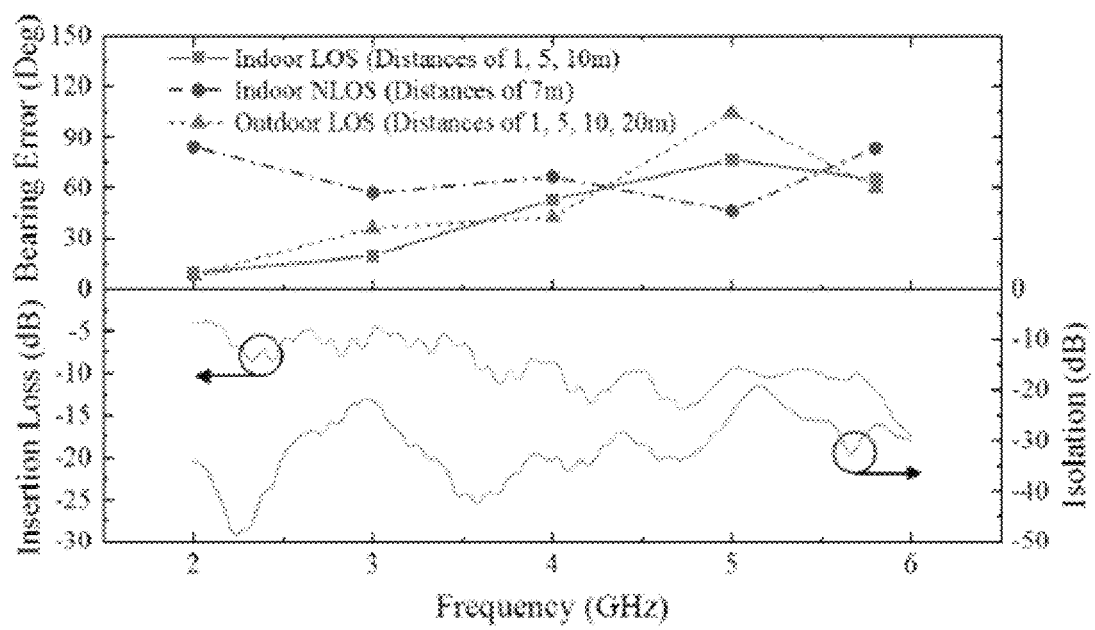
FIG. 5 shows experimental results of effects of operating frequency and insertion loss and isolation on system performance.

FIG. 5 shows experimental results of the effects of operating frequency and insertion loss and isolation on system performance. Specifically, FIG. 5 shows, in the top pane, experimental results of the effects of operating frequency on the angle difference of measured AoA for Indoor LOS and NLOS and Outdoor LOS for PDAA with 0.200λ spacing between adjacent monopoles. FIG. 5 also shows, in the bottom pane, the insertion loss and isolation measured across the tested switching board (e.g., 104).

In FIG. 5, an operating frequency $f_{op}$ greater than 3 GHz was shown to have an average θDiff above 50° for indoor and outdoor LOS. Increase in $f_{op}$ resulted in higher θDiff, which may be attributed to an increased insertion loss of the switching board (e.g., 104). Other factors that may attributed to a high average θDiff include higher path loss, lower receiver sensitivity, greater multipath effects, or additional surrounding factors during testing. To improve the accuracy of angle of arrival, the receiving system (e.g., 106) should have good impedance matching.

Channel Sounding

A sliding correlator technique was used to sound the channel, i.e., CIR, $h(t)=\Sigma_{l=0}^{L=0}\alpha_l\delta(t-t_l)$, by match filtering the received signal, $y(t)=x(t)*h(t)$, with the corresponding input PN sequence, $x(t)$, per Equation 1.

$$h(t) = y(t) * x(-t) =$$
$$(h(t) * x(t) * x(t)) * x(-t) = \sum_{l=0}^{L-1} \alpha_l \sum_j R_c(t - \tau_l - jT_s)$$
(Equation 1)

In Equation 1, L is the total number of multipath component ($L=2^N-1$), N is the degree of PN sequence (e.g., N=9), $\alpha_l$ and $\tau_l$ are the amplitude gain and delay of the lth multipath, respectively, $T_s$ is the total period of input PN sequence ($T_s=L/f_c$), and $R_{pn}(\bullet)$ is the correlation of a PN code signal. The $R_{pn}$ equals "1" for t=0 and integer multiples of Ts, and equals $-1/L$ otherwise.

Figure 6A:
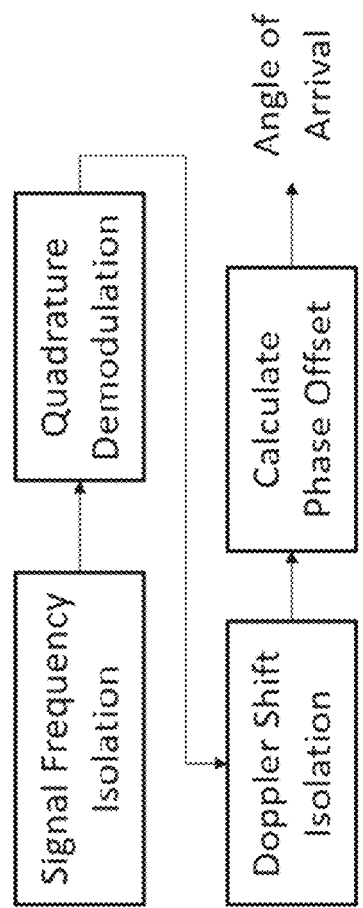
FIGS. 6A and 6B respectively show high-level and detailed simulation code for simulated direction-finding algorithms.
Figure 6B:
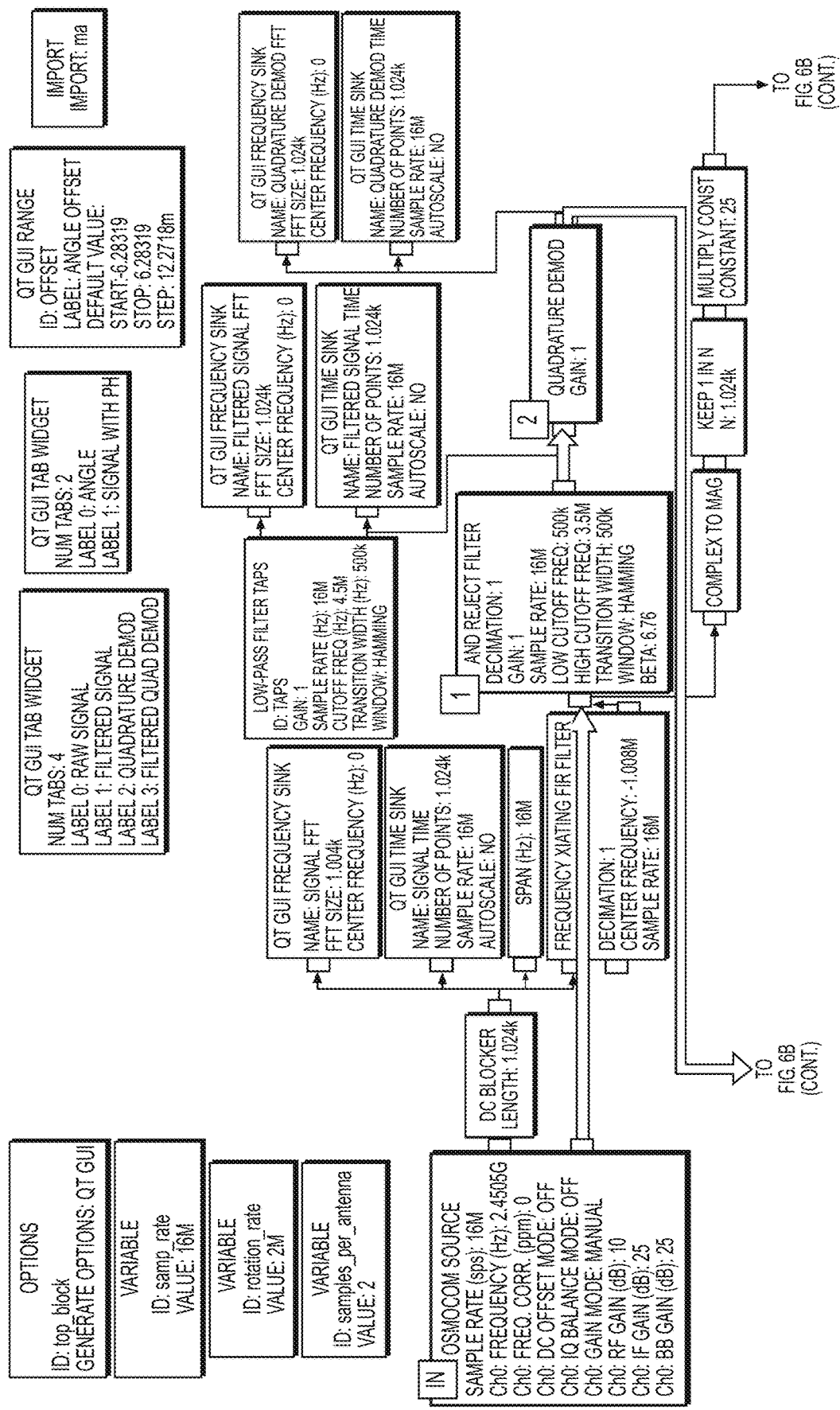
Figure 6B:
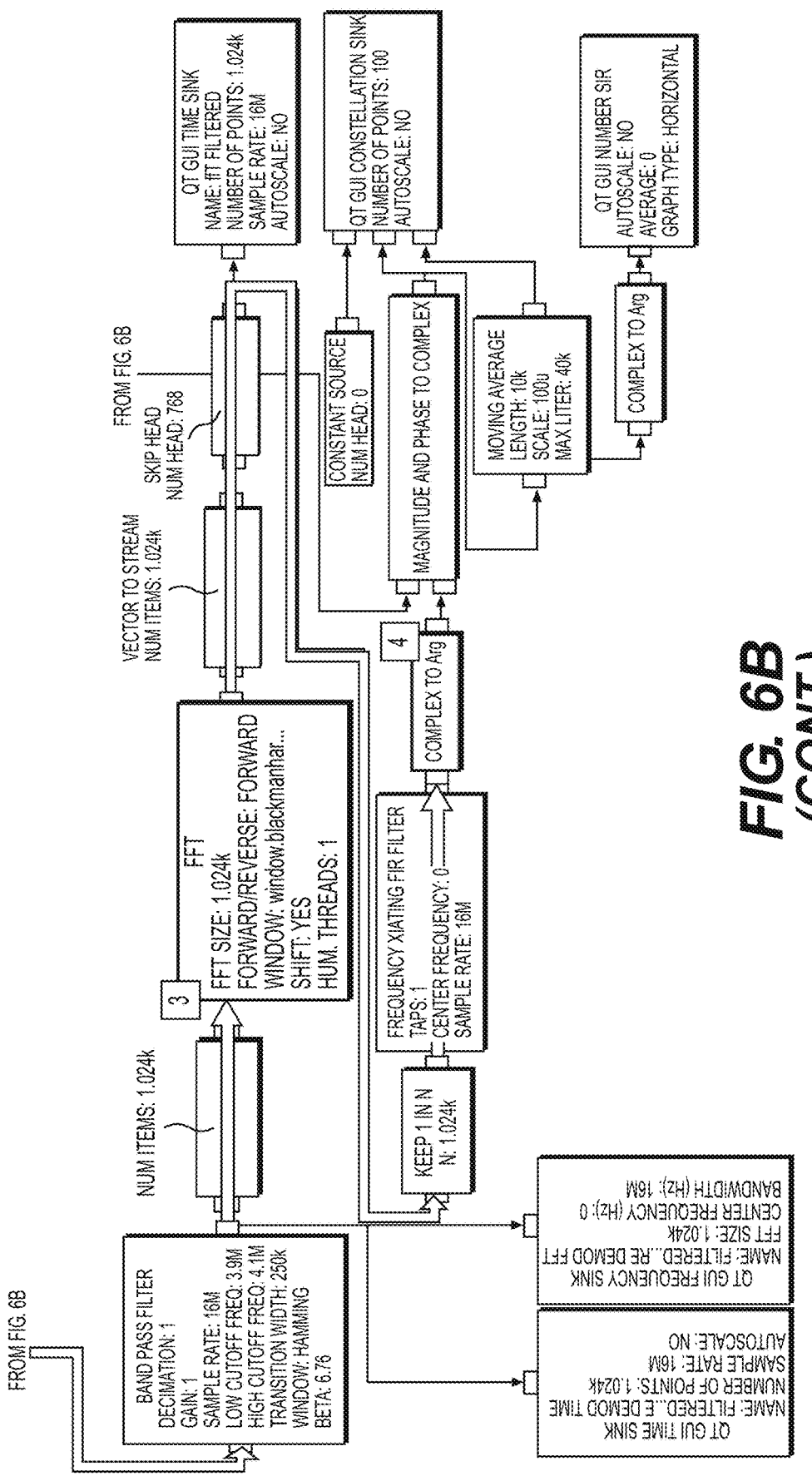
Figure 7A:
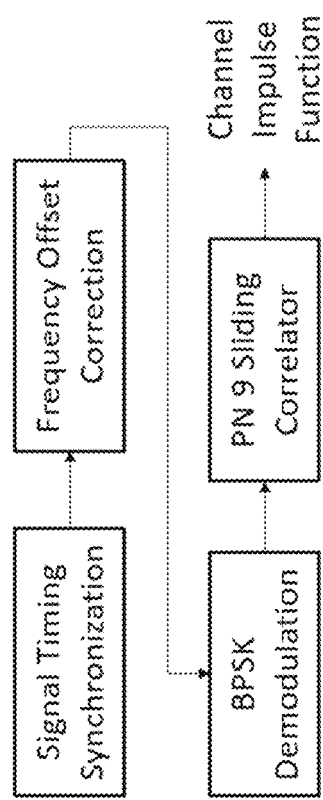
FIGS. 7A and 7B respectively show high-level and detailed simulation code for simulated channel sounding algorithms.
Figure 7B:
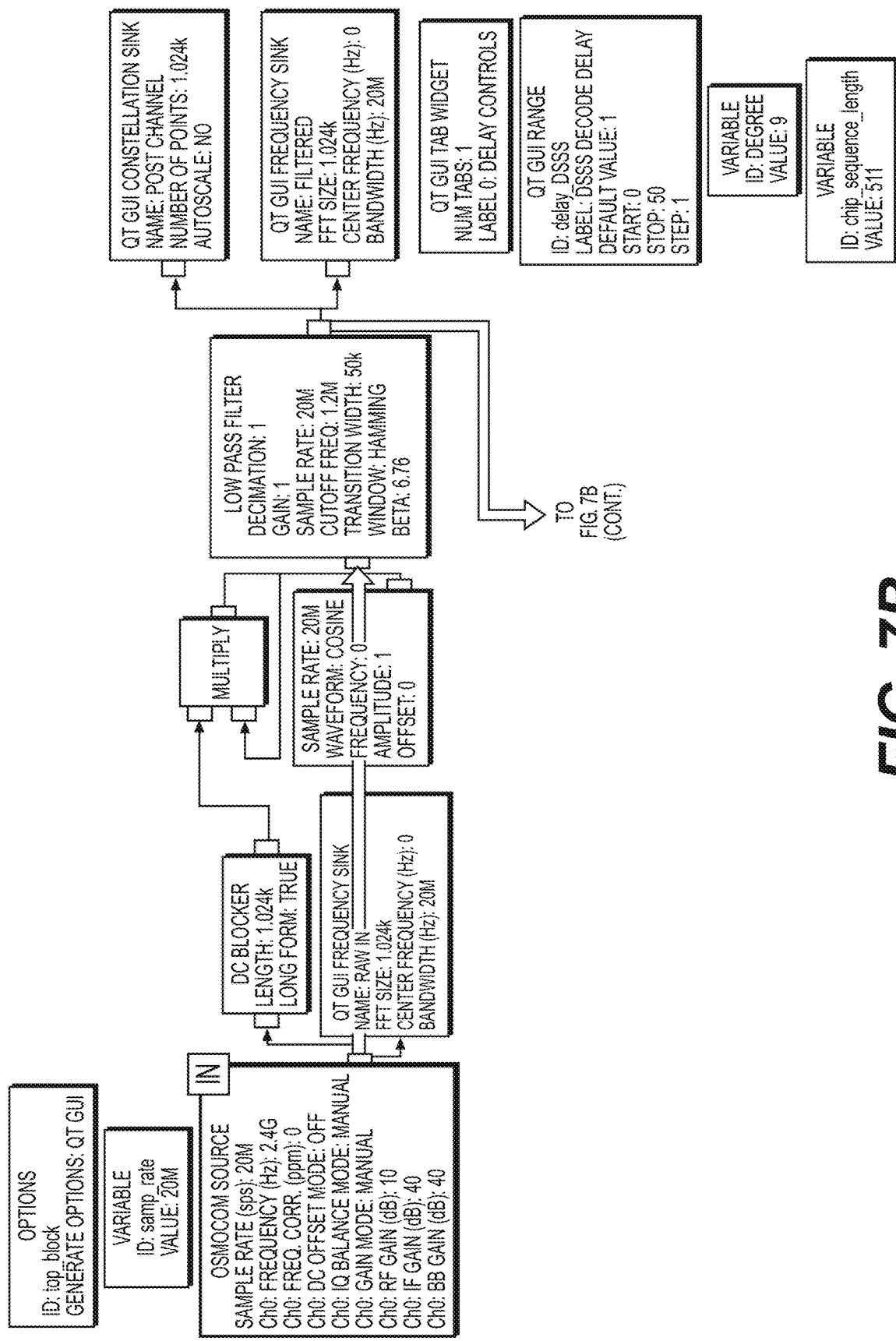
Figure 7B:
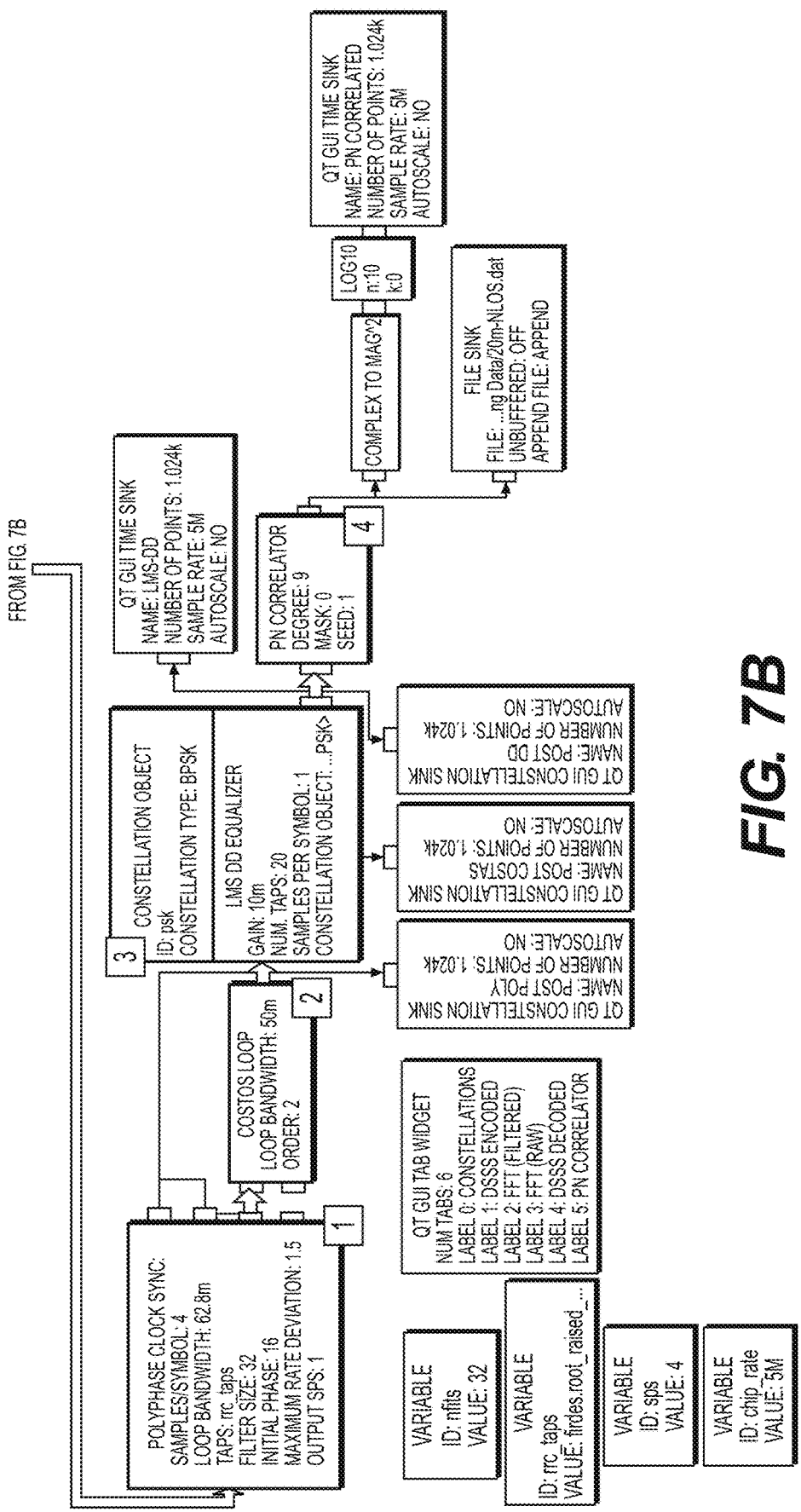

FIGS. 6A and 6B respectively show high-level and detailed simulation code (Matlab) for simulated direction-finding algorithms. FIGS. 7A and 7B respectively show high-level and detailed simulation code (Matlab) for simulated channel sounding algorithms.

Figure 8:
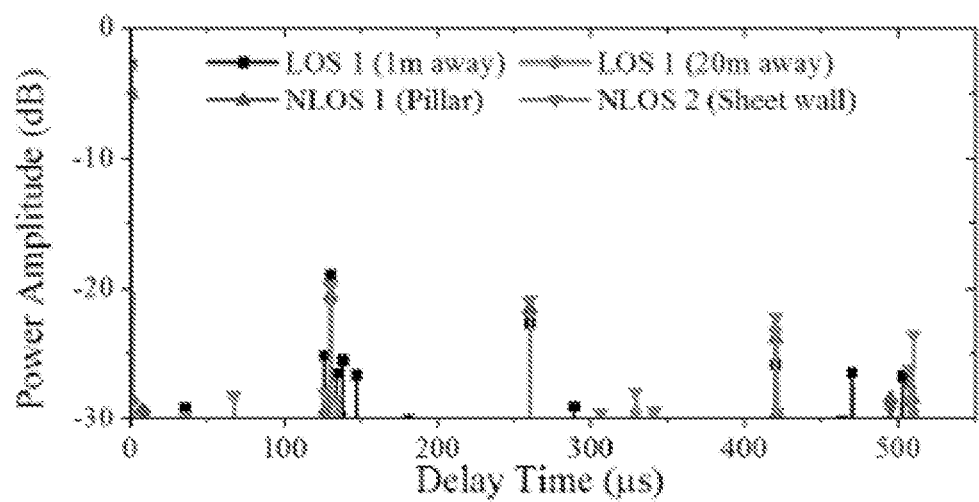
FIG. 8 shows experimental results of power delay profile for indoor LOS and NLOS.

FIG. 8 shows power delay profile for indoor LOS and NLOS. In FIG. 8, the multipath power-delay profile was calculated using the powers of the individual multipath components $|\alpha_1|^2$. From the power-delay profile, the channel parameters of mean excess delay, $\tau_m$ (Equation 2), root-mean-square delay spread, $\tau_{rms}$ (Equation 3), and coherence bandwidth, $B_c$ (Equation 4) were calculated:

$$\tau_m \Sigma_l P_l \tau_l / \Sigma_l P_l$$
(Equation 2)

$$\tau_{RMS} = \sqrt{\overline{\tau^2} - \tau_m^2}$$
(Equation 3)

$$B_c = 1/5\tau_{RMS}$$
(Equation 4)

In Equations 2-4, $\overline{\tau^2}=\Sigma_l P_l \tau_l^2/\Sigma_l P_l$, $P_l$ is the $|\alpha_1|^2$, and $\tau l$ is the delay (1 μs) [15-17]. The coefficient of 1/5 for $B_c$ refers to the amplitude correlation above 0.5, which is typical for indoor propagation [15]. The resulting $\tau_m$, $\tau_{RMS}$, and $B_c$ are listed in Table II along with reference values obtained under similar testing conditions [18].

TABLE 2

EXPERIMENTAL VALUES OF CHANNEL PARAMETERS

| Parameter | $\tau_m$(μs) | $\tau_{RMS}$(μs) | $B_c$ (kHz) |
|---|---|---|---|
| LOS Ref. [18] (Room, B) | 0.08 | .050 | 629 |
| LOS 1 (1 m) | 42.5 | 110.4 | 1.81 |
| LOS 1 (20 m) | 67.5 | 134.8 | 1.48 |
| NLOS 1 (Concrete Pillar) | 75.0 | 140.4 | 1.42 |
| NLOS 2 (Sheet wall) | 43.4 | 115.4 | 1.73 |

Because the calculated values showed a recognizable deviation from the reference values, thus higher $f_c$ may be useful to sound the indoor environment reasonably. For good channel sounding resolution in indoor settings, a fc of at least 20 MHz may be desired [16]. Because transmitter device used in the experiments were limited to an fc of 1 MHz, the tested Pseudo-doppler antenna array system experienced poor resolution. A higher fc transmitter device and wider bandwidth receiver device would allow for integration of improved channel sounding measurements with the direction-finding technique to allow for real-time adaptation of the angle of arrival to the channel.

Additional experimental results are provided in the Appendix A and B submitted herewith.

The specific configurations, choice of materials and the size and shape of various elements can be varied according to particular design specifications or constraints requiring a system or method constructed according to the principles of the disclosed technology. Such changes are intended to be embraced within the scope of the disclosed technology. The presently disclosed embodiments, therefore, are considered in all respects to be illustrative and not restrictive. The patentable scope of certain embodiments of the disclosed technology is indicated by the appended claims, rather than the foregoing description.

The following patents, applications and publications as listed below and throughout this document are hereby incorporated by reference in their entirety herein.

[1] D. Aloi and M. S. Sharawi, "Modeling and Validation of a 915 MHz Single Channel Pseudo Doppler Direction Finding System for Vehicle Applications," 2009 IEEE 70th Veh. Techno. Conf. Fall, January 2010.

[2] RDF Products, "A Comparison of the Watson-Watt and Pseudo-Doppler DF Techniques," White paper WN-004, Rev. N-01, April 1999.

[3] M. N. Islam, B. Kim, P. Henry, and E. Rozner, "A wireless channel sounding system for rapid propagation measurements," 2013 IEEE Int. Conf. Comm., pp. 5720-5725, November 2013.

[4] Keysight Technologies, "Defining a Channel Sounding Measurement System for Characterization of 5G Air Interfaces—Application notes," Keysight Technologies, December 2017.

[5] J. Hrabal, D. Seidl, M. Krumnikl, P. Moravec, and P. Olivka, "The Radio Direction Finding with Advantage of the Software Defined Radio," IFIP Int. Federation for Information Processing, pp. 720-728, September 2016.

[6] K. McClaning, Wireless Receiver Design for Digital Communication, 2$^{nd}$ Ed., Tamil Nadu, India: Yes Dee Publishing Pvt Ltd, pp. 329-355, 2012.

[7] N. Mitsushi, "Narrowband 5 GHz Mobile Channel Characterization," Thesis, University of Colorado Boulder, Boulder, Colorado, 2015.

[8] J. Reed, Software Radio: A Modern Approach to Radio Engineering. Upper Saddle River, New Jersey: Prentice Hall, pp. 180, 2002.

[9] Github.com, 'HackRF One', 2017. [Online]. Available: com/mossmann/hackrf/wiki/HackRF-One. [Accessed: 18-May-2018].

[10] M. C. E. Stieber, "Radio Direction Finding Network Receiver Design for Low-Cost Public Service Applications," Thesis, California Polytechnic State University, San Luis Obispo, California, 2012.

[11] R. Whitlock, "High gain pseudo-Doppler antenna," Antennas & Propagati Conf., Loughborough, pp. 169-172, November 2010.

[12] Synthetic Doppler Direction Finder for Use with FSK Encoded Transmitters, by David C. Cunningham. (1999, Aug. 31). Patent U.S. Pat. No. 5,945,947 A [Online]. Available: Patents.google.com.

[13] D. Peavey and T. Ogunfunmi, "The Single Channel Interferometer Using a Pseudo-Doppler Direction Finding System," Proc. of 1997 IEEE Conference, on Acoust., Speech, and Signal Processing, Vol. 5, pp. 4129-4132, April 1997.

[14] W. Read, "Review of conventional tactical radio direction finding systems," in *Defence Research Establishment Ottawa*, Ottawa, Canada, May 1989.

[15] J. Sadowski, "Measurement of Coherence Bandwidth in UHF Radio Channels for Narrowband Networks," *International Journal of Antennas and Propagation, Vol.* 2015, Article ID 985892, 2015.

[16] L. Novosel and G. Sisul, "Comparison of pseudo noise sequence lengths for a correlator channel sounder," 56*th Int. Symp. ELMAR*, October 2014.

[17] W. Ciccognani, A. Durantini, and D. Cassioli, "Time Domain Propagation Measurements of the UWB Indoor Channel Using PN-Sequence in the FCC-Compliant Band 3.6-6 GHz," *IEEE Trans. Ant. Propag.*, 53 (4), pp. 1542-1549, April 2005.

[18] M.Carroll, T.A.Wysocki, "Delay Characteristics for an IEEE 802.11a Indoor Wireless Channel", *Proc. Of ISCTA* '03, Ambleside, U.K., July 2003.

What is claimed:

1. A method to direction find a transmission source of a signal and characterize a wireless channel, the method including:
    transmitting, from a first device, a plurality of signals through the wireless channel, including a first transmitted signal and a second transmitted signal, wherein the first transmitted signal comprises a signal code sequence being a predefined code stored in memory of the first device and a second device, and wherein the plurality of signals are modulated in transmission to generate a Doppler shift of the transmitted plurality of signals;
    receiving, by a processor of the second device, the plurality of signals at a plurality of antennas, including a first received signal and a second received signal, wherein the first received signal corresponds to the first transmitted signal, and wherein the second received signal corresponds to the second transmitted signal, and wherein the second device is configured to receive Doppler-shifted signals through a switching system configured to switch between a channel sounding mode and a direction finding mode;
    determining, by the processor of the second device, a phase difference between the received first transmitted signal and the received second transmitted signal;
    characterizing the wireless channel using a channel sounding operation to estimate a characteristic value associated with the wireless channel, wherein the channel sounding operation comprises: (i) tuning to a carrier frequency, (ii) performing a time synchronization operation to determine a phase of root raised cosine pulses to maximize a signal-to-noise ratio (SNR), and (iii) Binary Phase Shift Keying (BPSK)-demodulating and match filtering the first transmitted signal with an inversed sequence of the signal code sequence to produce a channel impulse response;
    determining, by the processor of the second device, an angle of arrival of the plurality of signals based on the estimated characteristic value and the determined phase difference; and
    outputting, by the processor of the second device, at a graphic user interface of the second device, an indication of the determined angle of arrival.

2. The method of claim 1, wherein the step of match filtering comprises:
    performing a convolution operation of the received first transmitted signal and the signal code sequence.

3. The method of claim 1, wherein the signal code sequence is a pseudo-noise code having parameters known to the first device and second device.

4. The method of claim 1, wherein the plurality of antennas form an antenna array.

5. The method of claim 4, wherein the antenna array comprises an n-omnidirectional monopole antenna, wherein n has a value of 2, 3, 4, 5, 6, 7, 8, 9, 10, 11, 12, 13, 14, 15, 16, 17, or 18.

6. The method of claim 1, wherein the plurality of antennas are tuned for 2.4 Ghz reception.

7. The method of claim 1, wherein the plurality of antennas are tuned to a frequency band ranging between 1 Mhz and 6 Ghz.

8. The method of claim 1, wherein the processor of the second device comprises an embedded microcontroller.

9. The method of claim 8, wherein the embedded microcontroller is configured to execute a GNU radio and MATLAB coder.

10. The method of claim 1, wherein the step to determine the phase difference comprises use of one or more of a filter, a demodulator, a fast Fourier transform, and a complex to rectangular transform.

11. The method of claim 1, wherein the step to characterize the wireless channel comprises use of one or more of a clock synchronizer, a signal stabilizer, a demodulator, and an autocorrelator.

12. The method of claim 1, wherein the step to determine the phase difference comprises use of a filter selected from the group consisting of a low-pass filter, a high-pass filter, and a band-pass filter.

13. The method of claim 1, wherein the step to characterize the wireless channel comprises using a demodulator selected from the group consisting of an amplitude demodulator, a frequency demodulator, a phase demodulator, a quadrature demodulator, and a binary demodulator.

14. The method of claim 1, wherein the modulation in transmission is based on at least one of: amplitude modulation, frequency modulation, phase modulation, quadrature modulation, and binary modulation.

15. An apparatus comprising:
    a plurality of antennas;
    a processor; and
    a memory having instructions stored thereon, wherein execution of the instructions by the processor, causes the processor to:
    receive a plurality of signals at the plurality of antennas, including a first received signal and a second received signal, wherein the plurality of signals are transmitted from a transmitter device through a wireless channel, wherein the plurality of signals includes a first transmitted signal and a second transmitted signal, wherein the first transmitted signal comprises a signal code sequence being a predefined code stored in a memory of the transmitter device and a second device, and wherein the plurality of signals are modulated in transmission to generate a Doppler shift of the transmitted plurality of signals, and wherein the second device is configured to receive Doppler-shifted signals through a switching system configured to switch between a channel sounding mode and a direction finding mode;
    determine, by the processor, a phase difference between the received first transmitted signal and the received second transmitted signal;
    characterize, by the processor, the wireless channel using a channel sounding operation to estimate a characteristic value associated with the wireless channel, wherein the channel sounding operation comprises: (i) tuning to a carrier frequency, (ii) performing a time synchronization operation to determine a phase of root raised cosine pulses to maximize a signal-to-noise ratio (SNR), and (iii) Binary Phase Shift Keying (BPSK)-demodulating and match filtering the first transmitted signal with an inversed sequence of the signal code sequence to produce a channel impulse response;

determine, by the processor, an angle of arrival of the plurality of signals based on the estimated characteristic value and the determined phase difference; and output, by the processor, at a graphic user interface, an indication of the determined angle of arrival.

16. The apparatus of claim 15, wherein the plurality of antennas form an antenna array.

17. A non-transitory computer-readable medium having instructions stored thereon, wherein execution of the instructions by a processor, causes the processor to:

receive a plurality of signals at a plurality of antennas, including a first received signal and a second received signal, wherein the plurality of signals are transmitted from a transmitter device through a wireless channel, wherein the plurality of signals includes a first transmitted signal and a second transmitted signal, wherein the first transmitted signal comprises a signal code sequence being a predefined code stored in a memory of the transmitter device and a second device, and wherein the plurality of signals are modulated in transmission to generate a Doppler shift of the transmitted plurality of signals, and wherein the second device is configured to receive Doppler-shifted signals through a switching system configured to switch between a channel sounding mode and a direction finding mode;

determine, by the processor, a phase difference between the received first transmitted signal and the received second transmitted signal;

characterize, by the processor, the wireless channel using a channel sounding operation to estimate a characteristic value associated with the wireless channel, wherein the channel sounding operation comprises: (i) tuning to a carrier frequency, (ii) performing a time synchronization operation to determine a phase of root raised cosine pulses to maximize a signal-to-noise ratio (SNR), and (iii) Binary Phase Shift Keying (BPSK)-demodulating and match filtering the first transmitted signal with an inversed sequence of the signal code sequence to produce a channel impulse response;

determine, by the processor, an angle of arrival of the plurality of signals based on the estimated characteristic value and the determined phase difference; and output, by the processor, at a graphic user interface, an indication of the determined angle of arrival.

18. An integrated direction finder and channel sounding system comprising:

a plurality of antennas configured to:
    receive a plurality of signals through a wireless channel, including a first received signal corresponding with a first transmitted signal and a second received signal corresponding with a second transmitted signal, wherein the first transmitted signal comprises a signal code sequence being a predefined code stored in a memory of a first device and a second device, and wherein the plurality of signals are modulated in transmission to generate a Doppler shift of the transmitted plurality of signals, and wherein the second device is configured to receive Doppler-shifted signals through a switching system configured to switch between a channel sounding mode and a direction finding mode; and a processor configured to:
    determine a phase difference between the received first transmitted signal and the received second transmitted signal,
    characterize the wireless channel using a channel sounding operation to estimate a characteristic value associated with the wireless channel, wherein the channel sounding operation comprises: (i) tuning to a carrier frequency, (ii) performing a time synchronization operation to determine a phase of root raised cosine pulses to maximize a signal-to-noise ratio (SNR), and (iii) Binary Phase Shift Keying (BPSK)-demodulating and match filtering the first transmitted signal with an inversed sequence of the signal code sequence to produce a channel impulse response,
    determine an angle of arrival of the plurality of signals based on the estimated characteristic value and the determined phase difference, and
    output, at a graphic user interface, an indication of the determined angle of arrival.

* * * * *